United States Patent
Ott

(10) Patent No.: US 12,410,878 B2
(45) Date of Patent: Sep. 9, 2025

(54) PURGE STAND

(71) Applicant: CRAZEWELD LLC, Norwalk, OH (US)

(72) Inventor: Joshua D. Ott, Norwalk, OH (US)

(73) Assignee: CRAZEWELD LLC, Norwalk, OH (US)

( * ) Notice: Subject to any disclaimer, the term of this patent is extended or adjusted under 35 U.S.C. 154(b) by 204 days.

(21) Appl. No.: 17/846,233

(22) Filed: Jun. 22, 2022

(65) Prior Publication Data

US 2022/0412498 A1  Dec. 29, 2022

Related U.S. Application Data

(60) Provisional application No. 63/215,610, filed on Jun. 28, 2021.

(51) Int. Cl.
| | | |
|---|---|---|
| *B08B 9/02* | (2006.01) | |
| *B08B 5/02* | (2006.01) | |
| *F16L 55/00* | (2006.01) | |
| *F17D 3/10* | (2006.01) | |

(52) U.S. Cl.
CPC ................ *F16L 55/00* (2013.01); *B08B 5/02* (2013.01); *B08B 9/02* (2013.01); *F17D 3/10* (2013.01)

(58) Field of Classification Search
CPC ..... F17D 3/10; F17D 3/03; F17D 5/00; B08B 9/02; B08B 16/025; B08B 16/028; B05B 15/625; B05B 15/628; F16L 55/07
See application file for complete search history.

(56) References Cited

U.S. PATENT DOCUMENTS

| | | | | |
|---|---|---|---|---|
| 4,345,613 A | * | 8/1982 | Mills | F16T 1/00 |
| | | | | 137/317 |
| 5,273,214 A | * | 12/1993 | Huffstutler | B05B 15/628 |
| | | | | 239/279 |
| 5,437,299 A | * | 8/1995 | Kolpak | F17D 1/005 |
| | | | | 137/561 A |
| 6,056,004 A | | 5/2000 | Agnew | |
| 6,322,027 B1 | * | 11/2001 | Hsu | F16M 11/34 |
| | | | | 248/188.7 |
| 6,966,328 B2 | * | 11/2005 | Benham | F15D 1/14 |
| | | | | 137/315.01 |
| 7,413,372 B2 | * | 8/2008 | Meyers | E03F 3/046 |
| | | | | 404/2 |
| 7,506,395 B2 | * | 3/2009 | Eldridge | E03B 7/006 |
| | | | | 15/104.03 |
| 7,997,764 B1 | * | 8/2011 | Nielson | E01F 9/688 |
| | | | | 362/183 |
| 9,022,052 B2 | * | 5/2015 | Wendling | F16L 55/1604 |
| | | | | 137/15.02 |
| 10,036,511 B2 | * | 7/2018 | Dicke | G01L 19/0007 |

(Continued)

FOREIGN PATENT DOCUMENTS

GB        2508823 A      6/2014

*Primary Examiner* — Kevin F Murphy
(74) *Attorney, Agent, or Firm* — Jacob M. Ward; Ward Law Office LLC

(57) ABSTRACT

A purging device includes a main body having an inlet disposed at a first end of the main body and an outlet disposed at a second end of the main body. A base is positioned adjacent the first end of the main body, a testing port is disposed along the main body of the purging device, and a control valve is disposed between the inlet of the main body and the outlet of the main body.

20 Claims, 5 Drawing Sheets

(56) References Cited

U.S. PATENT DOCUMENTS

| | | | |
|---|---|---|---|
| 10,449,401 B2* | 10/2019 | Coffey | A62C 3/0214 |
| 2004/0188540 A1* | 9/2004 | Mills | B05B 15/628 |
| | | | 239/280 |
| 2012/0308940 A1 | 12/2012 | Caso | |
| 2013/0078851 A1* | 3/2013 | Esmacher | H01R 4/32 |
| | | | 439/527 |
| 2020/0340627 A1 | 10/2020 | Ott | |

* cited by examiner

PURGE STAND

CROSS-REFERENCE TO RELATED APPLICATIONS

This application claims the benefit of U.S. Provisional Application Ser. No. 63/215,610, filed on Jun. 28, 2021. The entire disclosure of the above application is incorporated herein by reference.

FIELD

The present invention relates generally to gas purging systems and, more particularly, to a device, kit, and method for purging natural gas.

INTRODUCTION

This section provides background information related to the present disclosure which is not necessarily prior art.

It is common to purge gas from piping, appliances, or other confined spaces. As one example, air from a newly constructed natural gas pipeline must be purged prior to filling the pipeline with natural gas in order to achieve one-hundred percent gas at all delivery points. Purging air from the natural gas pipeline militates against pilot lights and appliances being extinguished of their flames and the formation of a hazardous combination of air and natural gas that may be explosive or flammable. Additionally, gas purging may be necessary when repairing sections of existing pipeline. Proper above ground height as well as safe distances from buildings and overhangs is necessary when purging gas.

Known devices used for purging pipelines are often unable to safely expel gas from a pipeline and are located too close to a residential building or overhanging structure creating dangerous situations due to proximity. In addition, test ports used to measure the level of combustible gas within the gas system may create undesirable Venturi effects. Known purging devices are also not adaptable in various settings and on variable terrain.

In one particular example, U.S. Pat. No. 6,056,004 teaches a portable compression system for pipeline purging. However, the device does not safely and effectively expel dangerous gas away from the pipeline at a safe distance and is not adaptable or customizable in different surroundings. In another example, U.S. patent application Ser. No. 13/151,364 teaches a gas purging device and method including a gas purge burner used to burn off gas leaving a pipeline. However, the device does not address various safety concerns relating to purging a gas line and is cumbersome to use. In yet another example, U.S. patent application Ser. No. 17/480,338 teaches a gas purging apparatus that expels gas without discharge. However, the apparatus is difficult to use and not adaptable in various settings.

Accordingly, there is a continuing need for a purging device that is safe, durable, modular, and adjustable. Desirably, the purging device would be easy and efficient to use and transport, inexpensive to manufacture, and configured to work in a variety of settings.

SUMMARY

In concordance with the instant disclosure, a purging device that is safe, durable, modular, adjustable, easy and efficient to use and transport, inexpensive to manufacture, and configured to work in a variety of settings, has surprisingly been discovered.

In certain embodiments, a purging device includes a main body having an inlet disposed at a first end of the main body and an outlet disposed at a second end of the main body. A base is positioned adjacent the first end of the main body, a testing port is disposed along the main body of the purging device, and a control valve is disposed between the inlet of the main body and the outlet of the main body.

In another embodiment, a gas purging kit includes a purging device including a main body having an inlet disposed at a first end of the main body and an outlet disposed at a second end of the main body. The purging device includes a base positioned adjacent the first end of the main body, a testing port disposed along the main body of the purging device, and a control valve disposed between the inlet of the main body and the outlet of the main body. The gas purging kit further includes a flexible hose adapted to connect to the inlet of the main body, an extender adapted to connect to the outlet of the main body, at least one safety cone, and a carrying case.

In another embodiment, a method of using a gas purging kit comprises the step of providing a gas purging kit. The gas purging kit includes a purging device including a main body having an inlet disposed at a first end of the main body and an outlet disposed at a second end of the main body. A base is positioned adjacent the first end of the main body, a testing port is disposed along the main body of the purging device, and a control valve is disposed between the inlet of the main body and the outlet of the main body. The gas purging kit further includes a flexible hose adapted to connect to the inlet of the main body, an extender adapted to connect to the outlet of the main body, at least one safety cone, and a carrying case. The method further comprises the steps of identifying a gas system for purging, assembling the purging device, connecting the inlet of the purging device to the gas system, and purging a gas from the gas system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
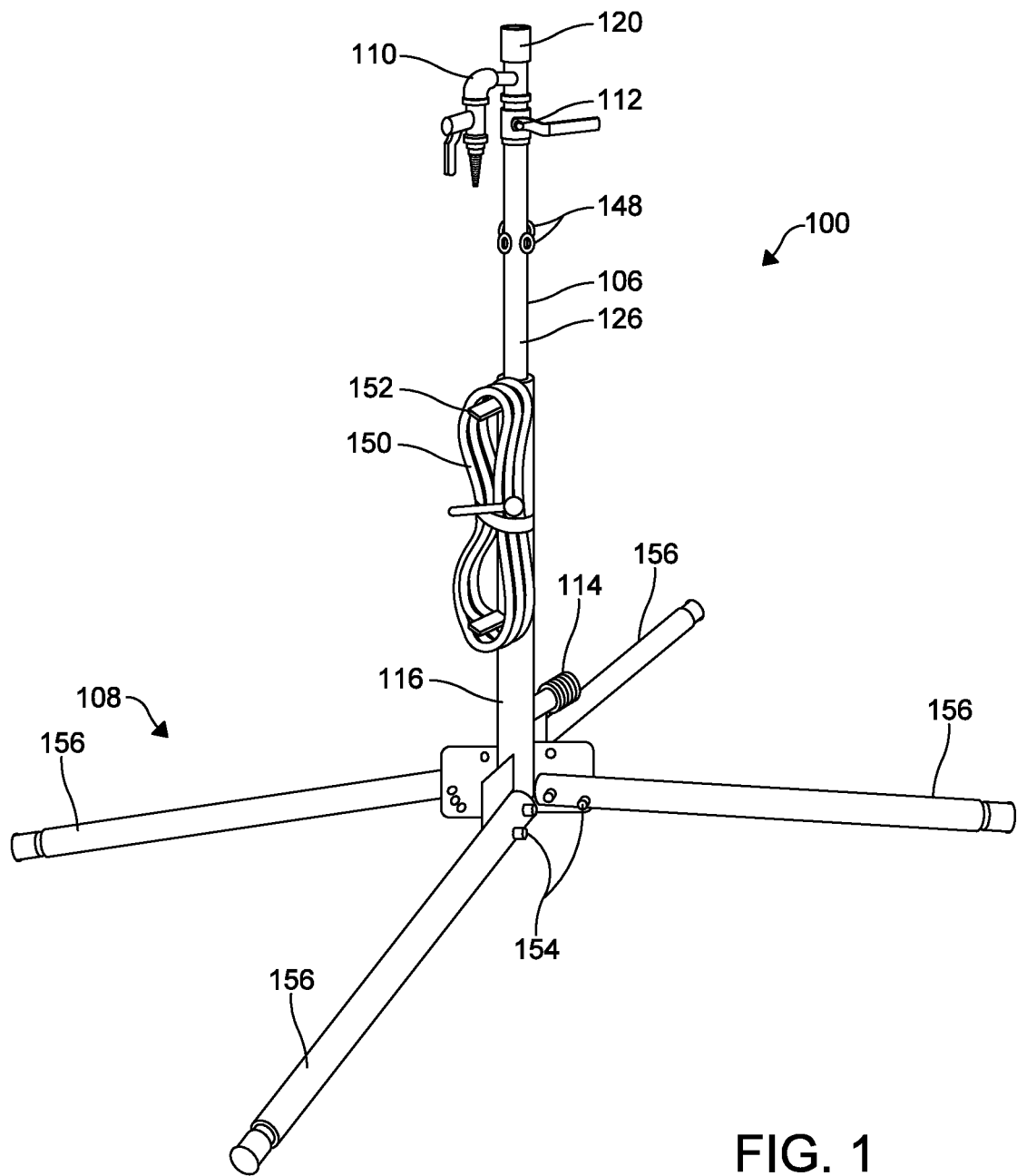
FIG. 1 is a top perspective view of a purging device, according to an embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
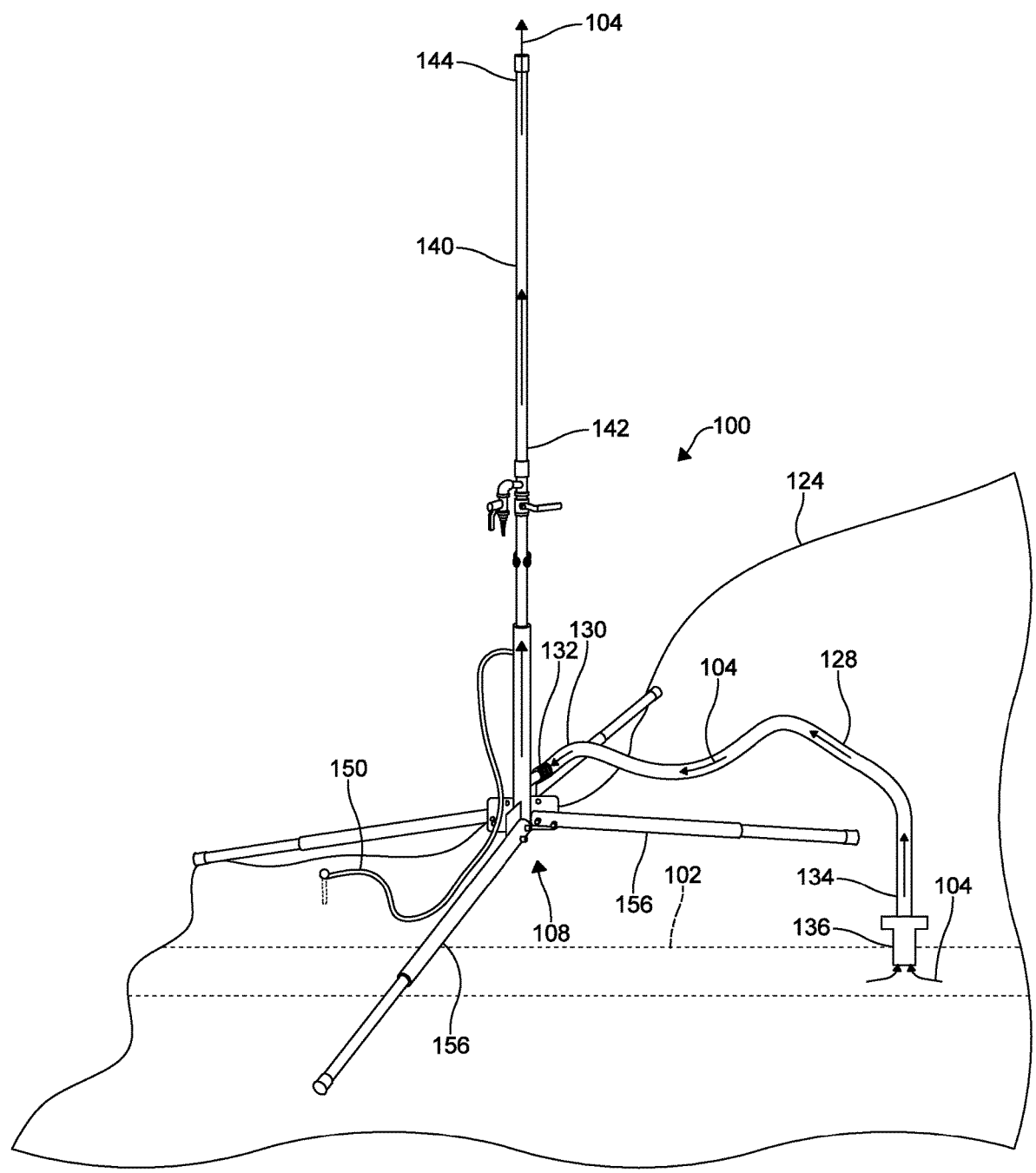
FIG. 2 is a top perspective view of the purging device of FIG. 1 shown in use.
Figure 3:
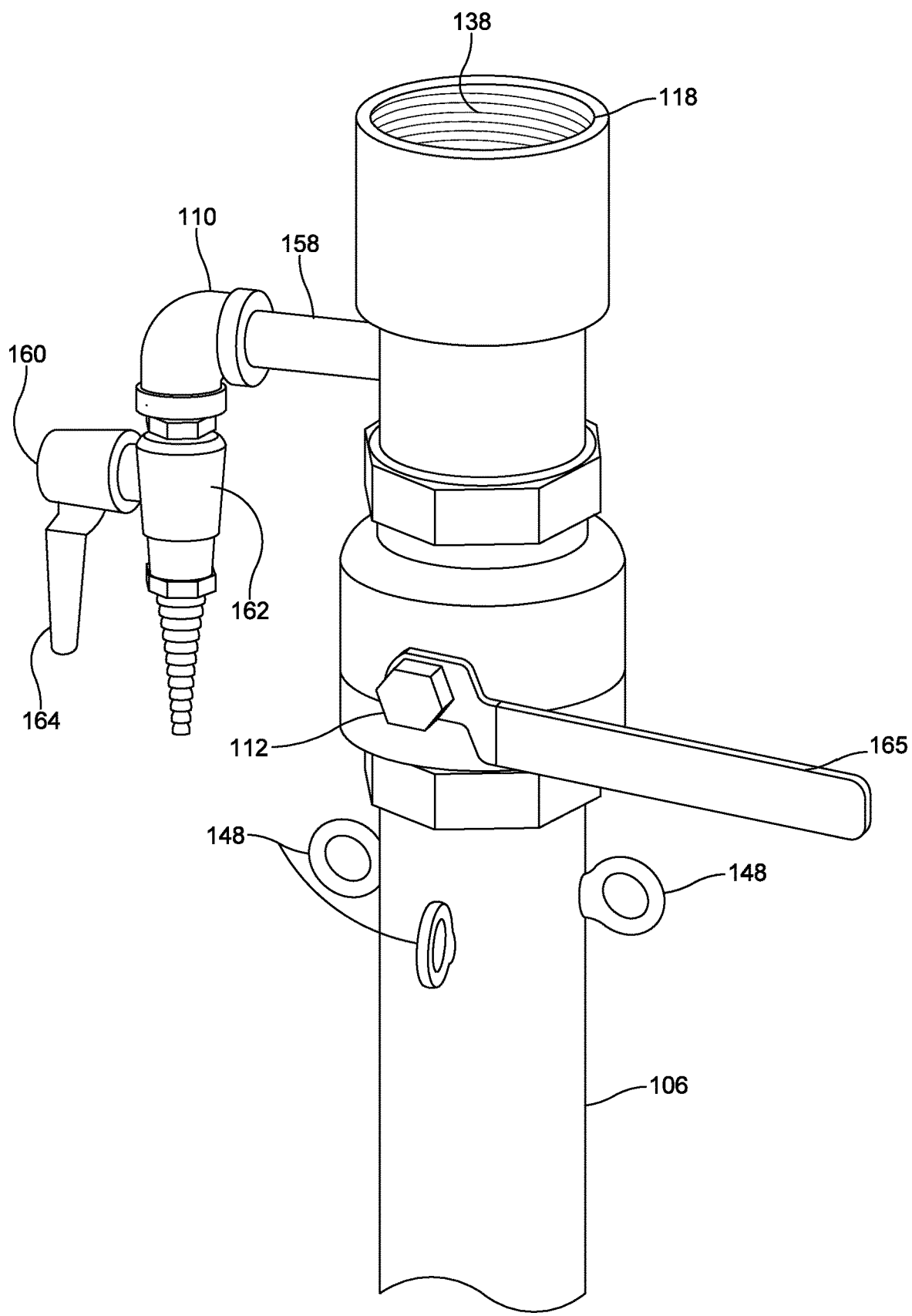
FIG. 3 is a top perspective view of a testing port and a control valve of the purging device of FIG. 1.

With reference to FIGS. 1-3, a purging device 100 is shown. The purging device 100 may be configured to connect to a gas system 102 allowing a technician to purge gas 104 from the gas system 102. As one non-limiting example, the gas system 102 may be a natural gas pipeline. The purging device 100, according to certain embodiments, may include a main body 106, a base 108, a testing port 110, and a control valve 112.

The main body 106 may be a conduit or other enclosed channel configured to receive gas 104 through an inlet 114 disposed at a first end 116 of the main body 106 and expel gas through an outlet 118 disposed at a second end 120 of the main body 106. The main body 106 may have any desirable shape, length, diameter, and thickness, as determined by one of skill in the art. As non-limiting examples, in certain embodiments, the main body 106 may have a diameter of three-quarters of an inch, one inch, or two inches.

Any material or combination of materials such as metal, plastic, composite, and wood may be used to fabricate the main body 106 of the purging device 100. It should be appreciated that a skilled artisan may employ materials and dimensions that match particular industrial standards and regulations, as needed. The main body 106 may have a height 122 that is fixed or adjustable. In certain more particular embodiments, the main body 106 may be fabricated using steel and capable of withstanding line pressure up to 125 PSI. In certain more particular embodiments, the main body 106 may be made using schedule 40 piping. Advantageously, the purging device 100 is lightweight, easy to transport, and inexpensive to manufacture. In another more particular embodiment, the main body 106 may be fabricated using steel and capable of withstanding line pressure greater than 125 PSI.

The inlet 114 may be configured to receive gas 104, such as air or natural gas, from the gas system 102. The inlet 114 may be integral with the main body 106 of the purging device 100 or may be permanently or removably connected to the main body 106, as determined by one of skill in the art. According to certain more particular embodiments, the inlet 114 may be disposed adjacent to a ground surface 124 to facilitate an easy, safe connection with the gas system 102. However, a skilled artisan may position the inlet 114 anywhere on or along the main body 106 of the purging device 100 between the first end 116 and the outlet 118.

According to certain embodiments, the inlet 114 may be an opening defined by the first end 116 of the main body 106 (not shown). Alternatively, in certain more particular embodiments, the inlet 114 may extend outwardly from a sidewall 126 of the main body 106, as shown in FIGS. 1-4. As one non-limiting example, the inlet 114 may be a conduit extending outwardly at a 90-degree angle from the sidewall 126 of the main body 106 adjacent the first end 116 of the main body 106. Any material or combination of materials such as metal, plastic, composite, and wood may be used to fabricate the inlet 114. In certain more particular embodiments, steel may be used to form the inlet 114 or a portion of the inlet 114.

In certain embodiments, as shown in FIG. 2, the purging device 100 may include a flexible hose 128 adapted to connect to the inlet 114 and be in fluid communication with the purging device 100 and the gas system 102. The flexible hose 128 may be made from any durable material capable of withstanding pressure from the gas system 102. As non-limiting examples, nylon, polyurethane, polyethylene, PVC, and synthetic or natural rubber may be used. A skilled artisan may select any suitable length and diameter for the flexible hose 128. In one more particular embodiment, the flexible hose 128 may be 12 feet in length. It should be appreciated that a skilled artisan may achieve fluid communication between the purging device 100 and the gas system 102 by employing any number of components and methods, within the scope of this disclosure.

The flexible hose 128 may be integral with or permanently or removably connected to the inlet 114 at a first end 130 of the flexible hose 128 using any suitable purge connecting means 132. As non-limiting examples, the flexible hose 128 may be removably connected to the inlet 114 using a threaded connection, a snap fit, a friction fit, or a quick connect fitting. The flexible hose 128 may be configured to removably connect to the gas system 102 at a second end 134 of the flexible hose 128 using one or more gas connecting means 136. In certain embodiments, the flexible hose 128 may include a variety of interchangeable gas connecting means 136 for connecting the second end 134 of the flexible hose 128 to a variety of gas systems 102, as needed. Advantageously, the flexible hose 128 allows the technician to purge gas 104 at a safe distance from the gas system 102. Additionally, the flexible hose 128 is lightweight and flexible for easy storage and transport and adaptable in variable settings and on variable terrain.

The outlet 118 may be configured to expel gas 104 into an external environment. In one non-limiting example, the outlet 118 may direct air from the gas system 102 to achieve a higher natural gas level in the gas system 102. According to certain more particular embodiments, the outlet 118 may be positioned to expel gas upwardly away from the ground surface 124. However, a skilled artisan may position the outlet 118 anywhere on the main body 106 between the inlet 114 and the second end 120 of the main body 106.

In certain embodiments, the outlet 118 may be integral with the main body 106 of the purging device 100 or may be permanently or removably connected to the main body 106, as determined by one of skill in the art. According to certain more particular embodiments, the outlet 118 may be defined by an opening 138 disposed at the second end 120 of the main body 106. Alternatively, in certain embodiments, the outlet 118 may extend outwardly from the sidewall 126 of the main body 106 (not shown). Any material or combination of materials such as metal, plastic, composite, steel, and wood may be used to form or define the outlet 118.

With renewed reference to FIG. 2, the outlet 118 may be configured to receive at least one extender 140 according to certain embodiments. The extender 140 may be configured to increase the height 122 of the main body 106 to militate against gas 104 escaping from the outlet 118 and contacting the technician or creating other hazardous conditions. The extender 140, in one non-limiting example, may be a conduit or other enclosed channel configured to receive the gas 104 from the second end 120 of the main body 106 at a first end 142 of the extender 140 and expel the gas 104 from a second end 144 of the extender 140 positioned at a distance from the purging device 100 and the gas system 102. The extender 140 may be removably connected to the outlet 118 of the main body 106 using a threaded connection, a snap fit, a friction fit, or a quick connect fitting, as non-limiting examples.

The extender 140 may have any desired shape, length, diameter, and thickness, as determined by one of skill in the art. The extender 140 may have a height 146 that is fixed or adjustable. Any material or combination of materials such as metal, plastic, composite, and wood may be used to fabricate the extender 140. It should be appreciated that a skilled artisan may employ materials and dimensions that match particular industrial standards and regulations, as needed. In certain more particular embodiments, the extender 140 may be fabricated using aluminum. In certain more particular embodiments, the height 122 of the main body 106 combined with the height 146 of the extender 140 may equal one of seven feet and ten feet, as non-limiting examples. Advantageously, the extender 140 allows the technician to safely purge gas 104 at a customizable height above ground to prevent dangerous conditions, protect the technician and any other workers nearby, and meet applicable industry and regulatory standards.

The main body 106 of the purging device 100 may include additional features such as a securing element 148, as one non-limiting example. The securing element 148 may be integral with the main body 106 or permanently or removably connected to the main body 106. The securing element 148 may be configured to connect to a strap or other tie-down means (not shown). The strap or other tie-down means may be configured to be connected to the ground surface 124 and used to secure and stabilize the purging device 100 with respect to the ground surface 124. In one more particular example, a plurality of securing elements 148 may extend outwardly from the sidewall 126 of the main body 106. Each securing element 148 may be adapted to receive a strap, rope, or other tie-down means adapted to connect to the securing elements 148 and to the ground surface 124. Any suitable material and configuration may be used to form the securing element 148. It should be appreciated that a skilled artisan may further stabilize the purging device 100 relative to the ground surface 124 by employing any number of components and methods, within the scope of this disclosure.

A grounding rod and cable 150 may be permanently or removably connected to the main body 106 of the purging device 100 and configured to provide a low resistance electrical path to the ground surface 124, according to certain embodiments. A skilled artisan may use any suitable grounding rod and cable 150, as desired. The main body 106 may include one or more attachment means 152 for securing and storing the grounding rod and cable 150 with the purging device 100 when the grounding rod and cable 150 are not in use. Advantageously, the grounding rod and cable 150 may reroute unwanted static electricity to the ground surface 124 to militate against gas 104 being ignited from the static electricity.

The base 108 may be integral with the first end 116 of the main body 106 of the purging device 100 or may be permanently or removably connected to the first end 116 of the main body 106 and may be configured to stabilize the purging device 100 during use. Any suitable base connecting means 154 may be employed. As non-limiting examples, the base 108 may be connected to the main body 106 using a plurality of threading connectors, thumb screws, friction fit, snap fit, or any other suitable means, as determined by one of skill in the art. The base 108 may be fabricated using any durable material or combination of materials such as metal, plastic, wood, and composite, as non-limiting examples. A skilled artisan may select any desirable shape and size for the base 108.

According to one more particular embodiment, the base 108 may include a plurality of legs 156 extending outwardly from the first end 116 of the main body 106 of the purging device 100 and configured to stabilize the purging device 100 with respect to the ground surface 124. Each leg 156 may be independently extendable, collapsible, and otherwise adjustable in both length and position relative to the ground surface 124 and the main body 106 of the purging device 100. In one more particular embodiment, each leg 156 may be adjustable with respect to the angle at which the leg 156 extends outwardly from the main body 106 of the purging device 100. According to certain more particular embodiments, each leg 156 may have a predetermined set of angled positions relative to the main body 106 of the purging device 100.

Advantageously, the adjustable legs 156 and easy-to-connect base 108 may allow the purging device 100 to be assembled and stabilized efficiently on uneven, rough ground surface 124. Additionally, the adjustable legs 156 may be easily collapsed and compactly stored adjacent the main body 106 of the purging device 100, as needed. The added stability added by the adjustable base 108 militates against hazardous conditions that may result from the purging device 100 falling over.

With reference to FIG. 3, the testing port 110 may include a first end 158 that is integrally formed with or permanently or removably connected to the sidewall 126 of the main body 106. The testing port 110 may be in fluid communication with the main body 106 of the purging device 100. The testing port 110 may have any desired shape, length, diameter, and thickness, as determined by one of skill in the art. Any material or combination of materials such as metal, plastic, composite, and wood, as non-limiting examples, may be used to form the testing port 110. In certain embodiments, the testing port 110 may be fabricated using a material that is capable of withstanding line pressure up to or exceeding 125 PSI. Additionally, according to certain embodiments, a size, position, orientation, and configuration of the testing port 110 relative to the main body 106 of the purging device 100 may be configured to militate against the gas creating a Venturi effect.

A testing valve 160 may be integrally formed in or connected to the testing port 110 device and configured to be selectively engaged by the technician to allow the gas 104 to flow out of a second end 162 of the testing port 110. More specifically, the technician may selectively allow gas 104 to flow out of the second end 162 of the testing port 110 when the testing valve 160 is in an open position and prevent gas 104 from flowing out of the second end 162 of the testing port 110 when the testing valve 160 is in a closed position. A handle 164 can be used to alternate the testing valve 160 between the open position and the closed position. Any suitable testing valve 160 capable of permitting and preventing gas 104 flow from the second end 162 of the testing port 110 may be used, such as a ball valve, gate valve, globe valve, or butterfly valve, as non-limiting examples.

In a more particular embodiment, the testing port 110 may be a 90-degree shoulder fitting including the testing valve 160, as shown in FIG. 3. In certain embodiments, the 90-degree shoulder fitting may be connected to the main body 106 using a three-eighths inch nipple welded to the main body 106, as one non-limiting example. In another more particular embodiment, the testing port 110 may be positioned between the inlet 114 of the main body 106 and the outlet 118 of the main body 106. The testing port 110 may militate against gas 104 creating a Venturi effect. It should be appreciated that one skilled in the art may employ different methods and structures for including a testing port 110 that is in fluid communication with the main body 106 of the purging device 100.

Advantageously, the testing port 110 allows the technician to measure the level of gas 104 within the gas system 102 while the gas 104 is flowing from the gas system 102 through the purging device 100. Additionally, in certain embodiments, the testing port 110 is configured to militate against gas 104 creating a Venturi effect.

The control valve 112 may be permanently or removably positioned within or along the main body 106 of the purging device 100 and configured to allow the technician to selectively prevent gas 104 from flowing out of the outlet 118 of the main body 106 using a handle 165 or other means extending outwardly from the main body 106 of the purging device 100. Any suitable valve type may be employed such as a ball valve, gate valve, globe valve, or butterfly valve, as non-limiting examples. In certain embodiments, the control valve 112 may be positioned within or along the main body 106 at a location that does not require the technician to bend over to access the control valve 112. In one more particular embodiment, the control valve 112 may be positioned between the inlet 114 of the purging device 100 and the testing port 110.

It should be appreciated that a person skilled in the art may select any suitable control valve 112 and may adjust the position of the control valve 112 as required, within the scope of this disclosure. It should be further appreciated that a skilled artisan may employ any suitable structural components and methods for controlling the flow of gas 104 through the main body 106 of the purging device 100, within the scope of this disclosure. Advantageously, the control valve 112 allows the technician to selectively allow gas 104 to be expelled from the purging device 100 or to prevent gas 104 from being expelled from the purging device 100.

Figure 4:
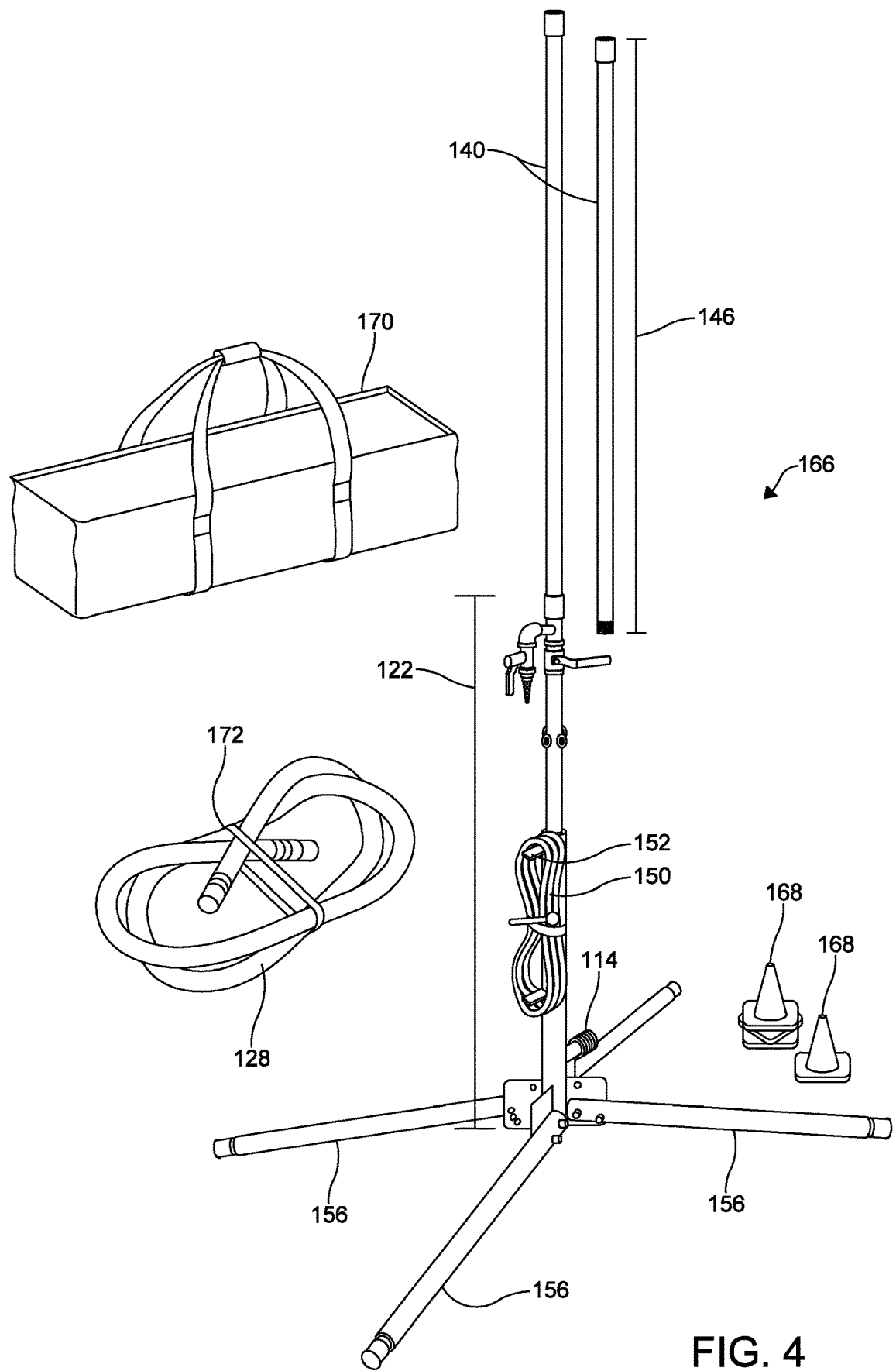
FIG. 4 is a top perspective view of a gas purging kit, according to an embodiment of the present disclosure.

In another embodiment of the present disclosure, a gas purging kit 166 is used to purge unwanted gas 104 from the gas system 102 or other gas source, as shown in FIG. 4. The gas purging kit 166 includes the purging device 100 according to various embodiments of the present disclosure, at least one flexible hose 128, at least one extender 140, one or more safety cones 168, and a carrying case 170. In certain embodiments, the gas purging kit 166 may include tie-down straps or other securing means (not shown) and hook and loop, elastic, or other organizing connectors 172 for organizing cords, straps, and hoses. Additionally, safety signage, additional testing equipment, replacement parts, and various fittings and connectors (not shown) may be included, as determined by one of skill in the art.

Advantageously, the gas purging kit 166 may be used to purge gas 104 or air from the gas system 102, while militating against associated hazards. For example, the safety cones 168 may be placed around the purging device 100 and adjacent the flexible hose 128 to visually point out a possible tripping hazard associated with the purging device 100. Additionally, the flexible hose 128 allows the technician to maintain a purge point at a safe operating distance. Likewise, the technician may adjust the overall height of the purging device 100 in order to meet safety standards and follow company specific procedures using one or more extenders 140, as needed. In certain more particular embodiments, the gas purging kit 166 may include flexible hoses 128 of variable length as well as extenders 140 of variable height thereby allowing the technician to select and appropriate distance and height from the gas system 102.

The light weight, collapsible components of the gas purging kit 166 including the main body 106, the base 108, the flexible hose 128, and the extender 140 are easy to store and transport using the convenient carrying case 170. Advantageously, each of the base 108, the flexible hose 128, and the extender 140 may be collapsed and placed in a compact position alongside the main body 106 inside the carrying case 170. The lightweight, thin materials such as aluminum and schedule 40 piping, as non-limiting materials, allow the technician to transport the gas purging kit 166 with ease. Likewise, the easy-to-use purge connecting means 132 and gas connecting means 136 allow for efficient set up and tear down of the gas purging kit 166.

Figure 5:
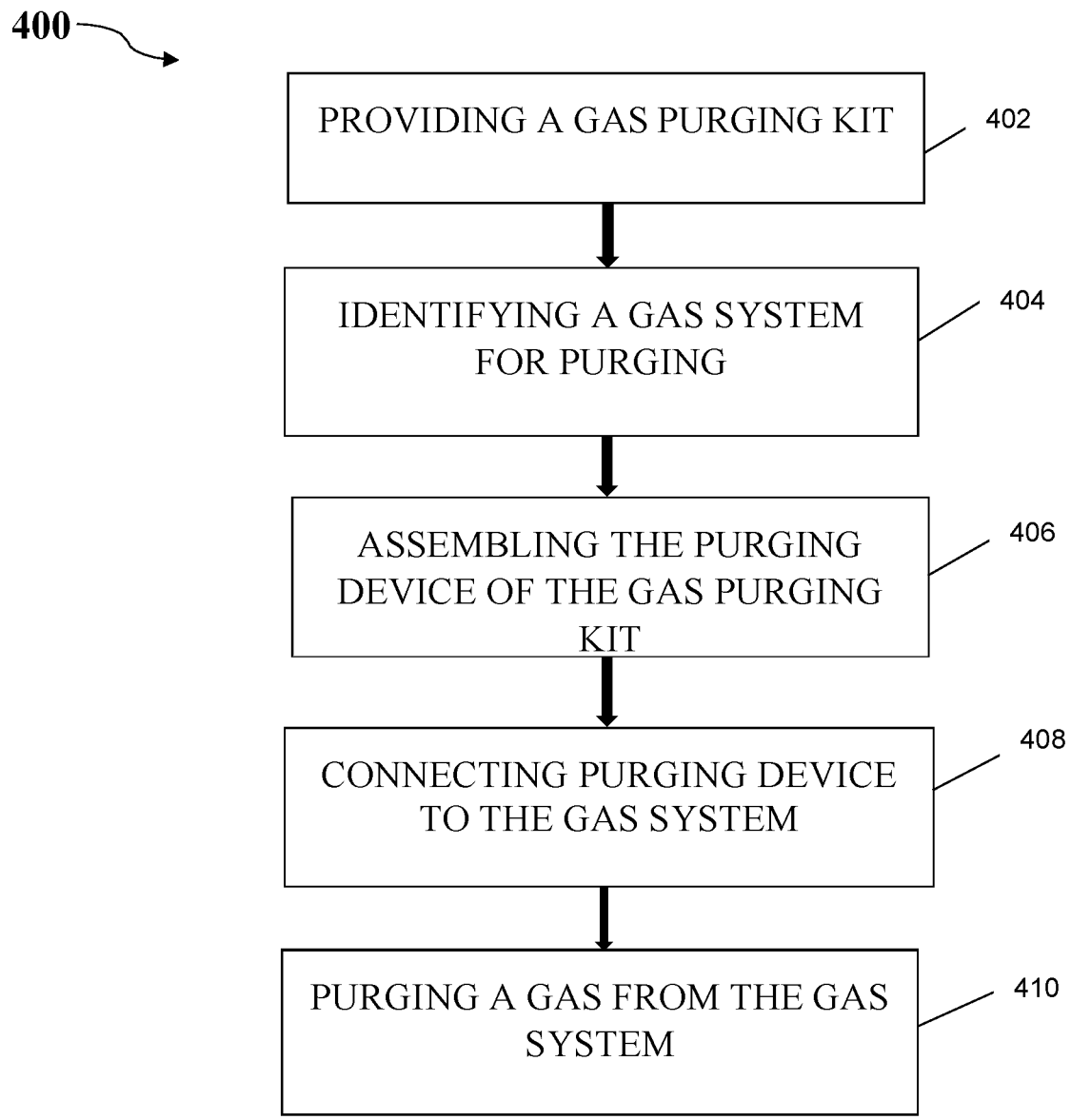
FIG. 5 is a method of using a gas purging kit, according to an embodiment of the present disclosure.

In yet another embodiment of the present disclosure, with reference to FIG. 5, a method 400 of using the gas purging kit 166, is shown. The method 400 may include a first step 402 of providing the gas purging kit 166. The method 400 may further include a second step 404 of identifying the gas system 102 for purging. A third step 406 may include assembling the purging device 100. As one non-limiting example, assembling the purging device 100 may include connecting the main body 106 to the base 108, adjusting the legs 156 of the base 108, selecting one or more of the flexible hose 128 and the extender 140 for use in combination with the purging device 100, securing tie-down straps to the securing elements 148 and to the ground surface 124, and securing the rod and cable 150 to the ground surface 124, as non-limiting examples. An additional step 408 may include connecting the inlet 114 of the purging device 100 to the gas system 102 using the flexible hose 128 such that the purging device 100 and the gas system 102 are in fluid communication with one another. A final step 410 may include purging the gas 104 from the gas system 102.

It should be appreciated that additional steps may be included, as determined by one of skill in the art. As non-limiting examples, various steps relating to the setup of the purging device 100, adjustment of various components such as the plurality of legs 156, safety precautions, testing, and disassembling of the gas purging kit 166 may be included. The method 400 for using the gas purging kit 166 may also include repeating or omitting various steps, as required. Advantageously, the purging device 100, the gas purging kit 166, and the method 400 of using the gas purging kit 166 may be used in a multitude of settings and may be customized, as determined by a skilled artisan.

Example embodiments are provided so that this disclosure will be through and fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, components and methods may be made within the scope of the present technology, with substantially similar results.

What is claimed is:

1. A purging device, comprising:
   a main body having an inlet disposed at a first end of the main body and an outlet disposed at a second end of the main body, the inlet including a conduit extending outwardly at a 90-degree angle from a sidewall of the main body;
   a base including a plurality of legs, each leg of the plurality of legs pivotally connected to a lowermost portion of the first end of the main body wherein the base is disposed below the inlet;
   a testing port disposed along the main body of the purging device, the testing port including a shoulder fitting configured to position the testing port substantially parallel to the main body; and
   a control valve disposed between the inlet of the main body and the outlet of the main body, the testing port disposed between the second end of the main body and the control valve.

2. The purging device of claim 1, wherein the main body is fabricated from schedule 40 piping.

3. The purging device of claim 1, further comprising a flexible hose adapted to connect to the inlet of the main body and provide fluid communication between the purging device and a gas system.

4. The purging device of claim 3, wherein the flexible hose is at least 12 feet in length.

5. The purging device of claim 1, wherein an extender is adapted to connect to the outlet of the main body.

6. The purging device of claim 5, wherein the extender is fabricated from aluminum.

7. The purging device of claim 5, wherein a height of the main body combined with a height of the extender is between seven feet and ten feet.

8. The purging device of claim 1, wherein the base has a plurality of securing elements extending outwardly from a sidewall of the main body, the securing elements configured to secure the purging device to a ground surface.

9. The purging device of claim 1, wherein the purging device includes a grounding rod and cable connected to the main body.

10. The purging device of claim 1, wherein the base is removably connected to the first end of main body.

11. The purging device of claim 1, wherein a length of each leg of the plurality of legs is independently adjustable.

12. The purging device of claim 1, wherein each leg of the plurality of legs extends outwardly from the main body of the purging device, and wherein an angle of each leg relative to the main body of the purging device is adjustable.

13. The purging device of claim 1, wherein the testing port extends outwardly from a sidewall of the main body, the testing port in fluid communication with the main body.

14. The purging device of claim 1, wherein each one of the legs each leg of the plurality of legs is disposed orthogonally to the main body.

15. The purging device of claim 1, wherein the lowermost portion of the first end of the main body further includes a projection, each leg of the plurality of legs pivotally connected to the projection.

16. The purging device of claim 1, wherein the shoulder fitting of the testing port is a 90-degree shoulder fitting.

17. A gas purging kit, comprising:
    a purging device including a main body having an inlet disposed at a first end of the main body and an outlet disposed at a second end of the main body, the inlet including a conduit extending outwardly at a 90-degree angle from a sidewall of the main body, a base including a plurality of legs, each leg of the plurality of legs pivotally connected to a lowermost portion of the first end of the main body wherein the base is disposed below the inlet, a testing port disposed along the main body of the purging device, the testing port including a shoulder fitting configured to position the testing port substantially parallel to the main body, and a control valve disposed between the inlet of the main body and the outlet of the main body, the testing port disposed between the second end of the main body and the control valve;

a flexible hose adapted to connect to the inlet of the main body;

an extender adapted to connect to the outlet of the main body;

at least one safety cone; and a carrying case.

18. The gas purging kit of claim 17, wherein each leg of the plurality of legs is independently adjustable, and an angle of each leg of the plurality of legs relative to the main body of the purging device is adjustable.

19. The gas purging kit of claim 17, wherein the testing port includes a 90-degree shoulder fitting and the testing port is adapted to militate against a gas from a gas system creating a Venturi effect.

20. A method of using a gas purging kit, comprising:

providing a gas purging kit including a purging device having main body having an inlet disposed at a first end of the main body and an outlet disposed at a second end of the main body, the inlet including a conduit extending outwardly at a 90-degree angle from a sidewall of the main body, a base including a plurality of legs, each leg of the plurality of legs pivotally connected to a lowermost portion of the first end of the main body wherein the base is disposed below the inlet, a testing port disposed along the main body of the purging device, the testing port including a shoulder fitting configured to position the testing port substantially parallel to the main body, and a control valve disposed between the inlet of the main body and the outlet of the main body, the testing port disposed between the second end of the main body and the control valve, a flexible hose adapted to connect to the inlet of the main body, an extender adapted to connect to the outlet of the main body, at least one safety cone, and a carrying case;

identifying a gas system for purging;

assembling the purging device;

connecting the inlet of the purging device to the gas system; and purging a gas from the gas system.

\* \* \* \* \*